United States Patent [19]

Lentz

[11] 4,082,009
[45] Apr. 4, 1978

[54] RANGE SHIFT CONTROL BY INPUT GOVERNOR

[75] Inventor: Carl A. Lentz, Mooresville, Ind.

[73] Assignee: General Motors Corporation, Detroit, Mich.

[21] Appl. No.: 750,129

[22] Filed: Dec. 13, 1976

[51] Int. Cl.² ............................................ F16H 47/00
[52] U.S. Cl. ........................................ 74/731; 74/865
[58] Field of Search ................... 74/731, 865, 869, 857

[56] References Cited

U.S. PATENT DOCUMENTS

| 3,937,106 | 2/1976 | Smith | 74/857 |
| 3,949,627 | 4/1976 | Murakami | 74/869 X |

*Primary Examiner*—Samuel Scott
*Assistant Examiner*—Frank H. McKenzie, Jr.

*Attorney, Agent, or Firm*—A. M. Heiter

[57] ABSTRACT

A multiratio powershift transmission having automatic shift valves normally operative in response to output speed governor pressure and throttle pressure to automatically upshift the transmission to higher ratios with increasing speed with the upshift at higher speeds with increasing throttle. A back-up governor pressure system having an input governor pressure regulated by a pressure regulator valve to provide a reduced modified governor pressure in first ratio and operative in response to progressively higher ratio signals to progressively increase the reduced pressure to provide a modified input governor pressure varying with output speed similar to output governor pressure which is used instead of output speed governor pressure to provide a similar shift schedule relative to output speed.

6 Claims, 7 Drawing Figures

RANGE SHIFT CONTROL BY INPUT GOVERNOR

The invention herein described was made in the course of work performed under a contract or subcontract thereunder with the Department of the Army.

This invention relates to automatic transmissions and particularly automatic transmission controls responsive to speed.

The invention provides in automatic speed responsive shifting multiratio transmissions, a governor control system responsive to transmission input speed operative to provide improved automatic shift control essentially similar to output speed automatic shift control. The input governor system for providing a composite modified input governor pressure increasing substantially proportional to output speed employs an input governor providing an input governor pressure proportional to input speed and a modifying regulator valve operative in the lowest transmission ratio to proportionally reduce input governor pressure to a proportionately lower first ratio modified governor pressure and in each higher transmission ratio to provide the input governor pressure in each higher ratio as each higher ratio modified governor pressure up to a limit value progressively higher with increasing transmission speed ratio and then regulate input governor pressure to provide higher ratio modified governor pressure increasing with increasing input speed in each higher speed ratio to provide a shifting operation composite modified input governor pressure employing, in response to shifting, the modified input governor pressure in each transmission ratio varying with output speed in a mean range of slopes in a manner simulating output governor pressure to provide a similar automatic shift control. The modifying regulator valve, in first ratio, reduces input governor pressure to provide a proportionately lower first ratio modified governor pressure, increasing at a lower rate relative to output speed than input governor pressure. Then, in each higher transmission ratio, a ratio signal for each ratio is cumulatively applied to cause the modifying regulator valve to regulate each higher ratio modified governor pressure at higher levels increasing at the same lower rate relative to input governor pressure in the respective higher transmission ratio. Since the lower speed portion of input governor pressure in each higher transmission ratio is lower than the regulated value, and since input governor pressure supplies the modifying regulator valve, the initial portion of each higher ratio modified governor pressure up to the limit value at the point of initial regulation is the same as input governor pressure in each transmission ratio.

The modifying input governor pressure regulator valve has a pressure reducing regulating portion responsive to input governor pressure bias and modified input governor pressure bias functioning in the first and higher transmission ratio drives, and a pressure increasing bias control responsive to progressively higher transmission ratio drives to increase the pressure level regulated by the pressure reducing regulating portion to progressively higher pressure levels in proportion to the ratio steps of the ratio drives and the relation of input and output governor pressures. The modified input governor pressure in the first ratio is a reduced pressure regulated by the pressure reducing regulating portion at a constant proportion of input governor pressure in first ratio at the lowest pressure level, preferably without pressure level increase. In each progressively higher ratio, the modified input governor pressure is the input governor pressure in each progressively higher ratio up to and then becomes in each ratio the input governor pressure in each ratio reduced in the same proportion and progressively increased to higher pressure levels in progressively higher ratios in proportion to the ratio increase and the relation of input and output governor pressures. When the transmission automatically shifts from one to another ratio, the overall or composite modified input governor pressure changes from the ratio modified input governor pressure provided in the one ratio to that provided in the other ratio to provide the composite or overall modified input governor pressure varying in a mean range of slopes with output speed and simulating output speed governor pressure for similar automatic shifting.

In the preferred transmission, an output governor normally supplies governor pressure to the automatic shift control system for automatic speed responsive shifting. The automatic shift valves are responsive to output speed governor and throttle pressure control of automatic shifting. The composite modified governor pressure is lower than the output governor pressure relative to the output speed and not connected to the shift controls. On a reduction of output governor pressure to values lower than modified input governor pressure in relation to output speed, the modified input governor pressure is connected by a shuttle valve to the automatic shift controls to control automatic shifting in a similar manner relative to output speed.

In another form of the invention, a torque demand or throttle position responsive force is applied to a similar modifying regulator valve to provide a modified input governor and throttle pressure signal similar to modified input governor pressure at low or idle torque demand and decreasing relative to the modified input governor pressure proportionally to increasing torque demand. This modified input governor and throttle pressure signal is used to control automatic shift valves having an opposing spring bias force to provide a simulated output speed and torque demand controlled automatic shifting.

These and other features of the invention are more fully explained in the following description and accompanying drawings, wherein:

FIG. 1 shows the arrangement of combined FIGS. 2a and 2b;

FIGS. 2a and 2b, when combined as shown in FIG. 1, diagrammatically show a transmission and automatic shift control system with input and output speed governor systems;

Figure 5:
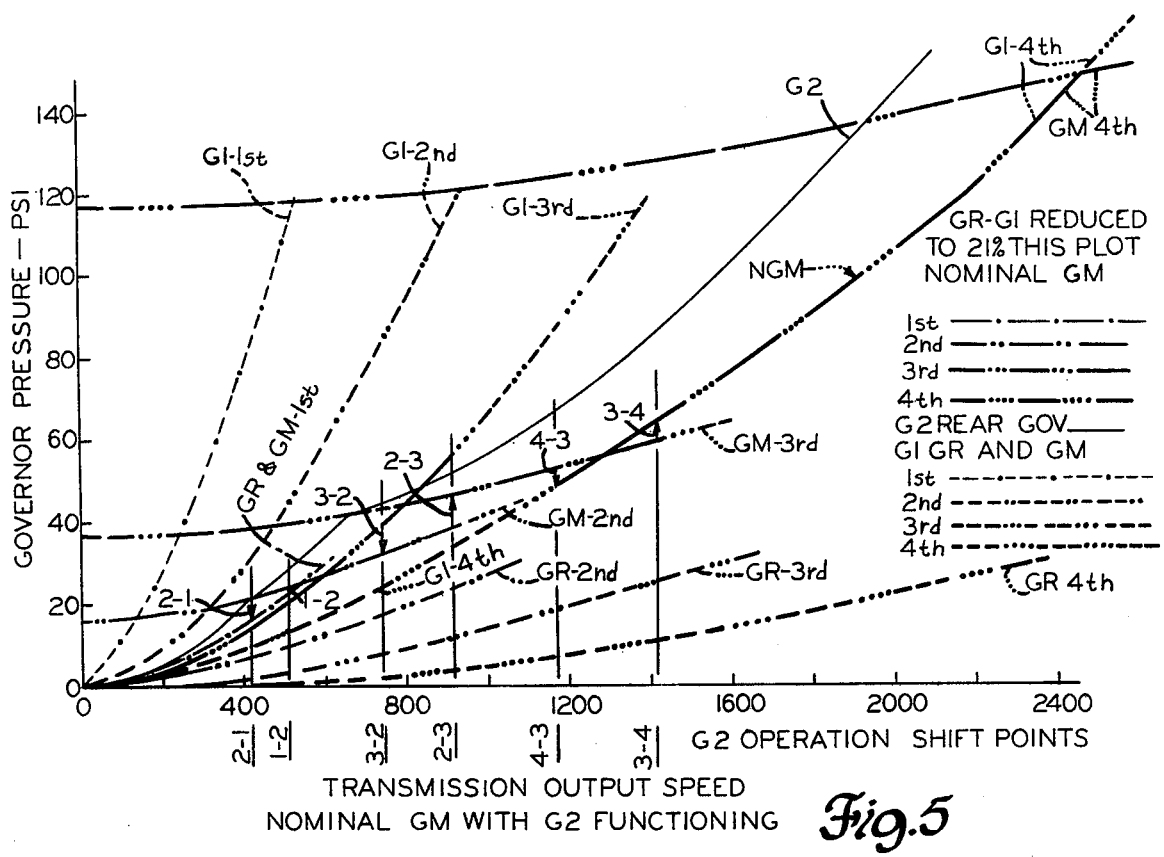
Figure 6:
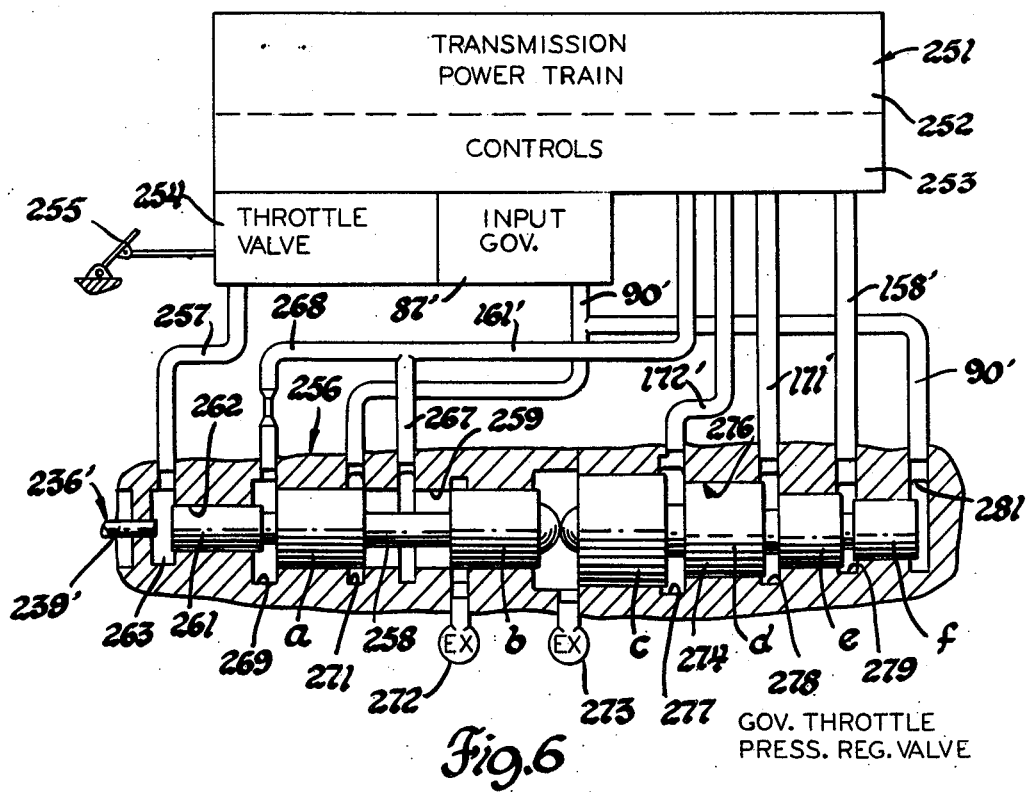

FIG. 5 is a plot of input governor pressure, reduced pressure, modified input governor pressure and output governor pressure relative to output speed to show input governor regulator operation and output governor pressure automatic operation for up and down shifting; and FIG. 6 is a diagrammatic view of a modification having a similar transmission and controls providing a modified input governor and throttle pressure for controlling automatic shift valves.

In this description of the invention, an automatic transmission having a back-up input speed governor pressure system, a conventional automatic transmission having the essential features for employing this invention, is briefly described. For further details of the conventional torque converter, powershift gearing, and automatic output speed and torque demand responsive shift controls, reference may be made to U.S. Pat. No. 3,691,872, granted to Robert H. Schaefer and Joseph R. Fox on Sept. 19, 1972.

Referring to the drawing, FIG. 2a shows the power train having an input shaft 10 driving a conventional rotary torque converter 11 which may include a lock-up clutch connected in parallel to drive intermediate or gear transmission input shaft 12 of powershift transmission 13.

The powershift transmission 13 has a 4-speed gear unit 14 having three planetary gearsets. The rear or first gearset 16 has planetary pinions 17 mounted on a carrier 18 and meshing with sun gear 19 and ring gear 21. The second gearset 22 has pinions 23 rotatably mounted on carrier 24 and meshing with sun gear 26 and ring gear 27. The third gearset 28 has planetary pinions 29 mounted on carrier 31 and meshing with sun gear 32 and ring gear 33.

The foreward clutch 36 is engaged in all forward ratios and connects the converter output or intermediate shaft 12 to drive the gear unit primary input shaft 37 which drives, through hub 38, sun gear 19 of first gearset 16 and through hub 39, ring gear 27 of second gearset 22. The forward clutch 36 has input plates 41 mounted on input drum 42 driven by rotary hub 43 drive connected to shaft 12. The hub 43 has a cylinder 44 formed therein for piston 46. On the supply of fluid by drive 4 line 108 to cyliner 44, piston 46 engages input plates 41 and output plates 47 which are connected by a hub 48 to drive gear unit primary input shaft 37. Fourth speed clutch 51 connects intermediate shaft 12 to secondary input shaft 52 which drives sun gears 26 and 32 of respective second and third gearsets 22 and 28, and with the above forward clutch drive locks the gearing for 1:1 drive from carrier 24, ring gear 33, and carrier 18 to the output shaft 53. The 4th speed clutch 51 has an input drum 54 formed as a continuation of drum 42 and is thus driven by intermediate shaft 12 and drives input plates 56. The output plates 57 are connected by output drum 58 and hub 59 to secondary input shaft 52. The hub 59 has a cylinder 61 formed therein for piston 62 and, on the supply of fluid to the cylinder by 4th clutch apply line 211, piston 62 engages the plates to effect a drive from intermediate shaft 12 to secondary input shaft 52 to drive sun gears 26 and 32. The shaft 52 may also be held by 3rd speed brake 63, which has fixed plates 64 grounded to transmission housing 66 and rotary plates 67 drive connected through drum 68 and hub 69 to secondary input shaft 52 to hold shaft 52. When fluid is supplied by 3rd brake apply line 212 to cylinder 71 formed in housing 66 to move piston 72 to engage plates 64 and 67, 3rd brake 63 is engaged to hold secondary input shaft 52 and sun gears 26 and 32. The 2nd speed brake 73 has a plurality of fixed plates 74 fixed to housing 66 and rotary plates 76 connected by hub 77 to the carrier 31 of the third gearset. When fluid is supplied by 2nd brake apply line 209 to the cylinder 78 formed in housing 66, piston 79 moves to engage plates 74, 76, and holds carrier 31. The 1st and reverse brake 81 has a plurality of fixed plates 82 secured to housing 66 and rotary plates drive connected to ring gear 21.

When fluid is supplied by 1st speed brake apply line 201 to the cylinder 84 formed in housing to move the piston 86 and engage plates 82, 83, ring gear 21 of first gearset 16 is held.

CONTROLS

The brakes and clutches are engaged, as indicated by "X" on the following chart, and the others disengaged to provide neutral, four forward speeds, and reverse:

| DRIVES | BRAKES | | | CLUTCHES | |
|---|---|---|---|---|---|
| | 1st-Rev. 81 | 2nd 73 | 3rd 63 | 4th 51 | For'd. 36 |
| R | X | | | X | |
| N | X | | | | |
| 1 | X | | | | X |
| 2 | | X | | | X |
| 3 | | | X | | X |
| 4 | | | | X | X |

FLUID SUPPLY

Referring to FIG. 2b, the fluid exhausted from the control and lubrication systems collects in a sump in the lower portion of transmission housing 66 and is supplied by regulated pressure source 91 to mainline 92. The source 91 conventionally has an input pump and pressure regulator valve. Mainline 92 also conventionally supplies the torque converter 11, lock-up clutch, and lubrication systems.

GOVERNORS

A front or input governor 87 (FIG. 2a) of the conventional pitot type provides input governor pressure proportional to the speed of the gear transmission input shaft 12. The input governor 87 has a can or annular trough 88 rotatably mounted on input drum 42 and thus rotatable with shaft 12. A restricted supply of fluid from the lubrication system or mainline 92 fills the can 88 providing a rotating annular body of fluid which impinges on the open end of pitot tube 89 to provide a pressure in input governor line 90 proportional to gear transmission input speed. Input pitot governors are conventionally used to control a lock-up shift valve for a lock-up clutch.

The mainline 92 supplies conventional output governor 93 driven by output shaft 53 and supplying output governor pressure varying with output shaft speed in accordance with output speed governor pressure (curves G2, FIGS. 3, 4, and 5) in output governor pressure line 94. The conventional governor has a plurality of weights to provide this stepped governor pressure curve G2, a close proximate of a straight line governor pressure curve.

SELECTOR VALVE

The manual selector valve 96 has a valve element 97 having equal diameter lands a, b, and c, in bore 98. In all valve positions, mainline 92 is connected to bore 98 between lands 97b and 97c. In neutral, the mainline 92 is blocked between lands 97a and 97b. The reverse selector or drive line 101 is connected to exhaust 102. The drive 1 feed line 103, drive 2 feed line 104, and drive 3 feed line 106 are connected to exhaust 107. The drive 4 feed line 108 is connected to hold feed line 109, and both these lines are connected by hold regulator valve 111, hold pressure line 112, and drive 3 feed line 106 to exhaust 107.

On movement of selector valve 96 to drive positions, the above exhaust connections provided in neutral are continued, except for the exhaust connection replaced by the following pressure connections. In reverse position, land 97c closes exhaust 102 and connects mainline 92 to reverse selector line 101. In drive 4 position [DR4], mainline 92 feeds drive 4 line 108. In drive 3 position (DR3], mainline 92 additionally feeds hold feed line 109 and blocks the exhaust of drive 3 feed line 106. In drive 2 position [DR2], mainline 92 feeds the same lines and interconnects drive 2 feed line 104 and drive 3 feed line 106. In drive 1 position [DR1], mainline 92 feeds the same lines and drive 1 feed line 103, drive 2 feed line 104, and drive 3 feed line 106 are interconnected.

HOLD REGULATOR VALVE

The hold regulator valve 111 (FIG. 2b), regulates the pressure distributed by the drive 1, 2, and 3 feed lines, and has a valve element 116 having equal diameter lands a, b, and c, located in a bore 117. A spring 118, located in a spring chamber vented by exhaust 119, biases valve element 116 to the open position shown. In the open position shown, the restricted hold feed line 109 is connected to the space between lands 116b and 116c and supplies hold pressure supply line 112 which is connected to drive 3 feed line 106. This hold pressure supply line 112 is also connected by restricted passage 121 to closed chamber 122 at the end of bore 117 to act on land 116a of valve element 116 to oppose the spring bias. The pressure in chamber 122 moves the valve element 116 against the spring 118 to connect hold pressure line 112 to exhaust 123 or hold feed line 109 to regulate hold pressure in hold pressure line 112 at a value less than mainline 92 pressure.

INVERTED THROTTLE PRESSURE REGULATOR VALVE

The inverted throttle pressure regulator valve 126, (FIG. 2b), provides a pressure inversely proportional to torque demand and has a valve element 127 having equal diameter lands a and b mounted in a bore 128. The spring 129, located in a spring chamber 131 at one end of bore 128 vented by exhaust 132, biases the valve element 127 to the open position, connecting mainline between lands 127a and 127b to throttle pressure line 133, which is connected by a restricted branchline 134 to chamber 136 at the other end of bore 128 to act on the end of land 127b to bias valve element 127 to connect throttle pressure line 133 between lands 127a and 127b to exhaust 137, to regulate the throttle pressure inversely proportional to throttle angle or torque demand on the engine or the increasing force delivered by actuator 138 as the throttle is advanced from idle to full throttle.

The actuator 138 has a throttle linkage portion, shown as Arrow 139, moving from idle to full throttle in the direction of the Arrow 139 to act on movable abutment 141 in guide bore 142 to compress spring 143 proportional to throttle position and deliver a force via abutment 144 and force-transmitting pin 146 to valve element 127 proportional to throttle position. The abutments 141 and 144 are guided, but not sealed in bore 142. Exhaust 147 prevents accumulation of leakage fluid in actuator 138.

SHIFT SIGNAL VALVES

Automatic shifting between 1st and 4th speed forward drives is provided by speed and torque demand signal controlled shift signal valves, one for each speed change, and each having an associated relay valve. The shift and relay valves for each speed changed are similar, to the 1-2 shift signal valve 151 and 1-2 relay valve 176 are described in detail and then the different structures and connections of the other valves are described.

This automatic shift control system may have conventional restrictions for restricting flow in both directions, check valves and restrictions for more restricted flow in one direction in supply lines, and trimmer valves connected to supply lines to control shift pressure change for improved shift quality, as taught in the above U.S. Pat. No. 3,691,872 Schaefer and Fox.

The 1-2 shift signal valve 151, (FIG. 2b), has a valve element 152, having land a and larger than b in a stepped bore 153, and a control element 154, having lands a, b, and c, of increasing diameter, from a to c, mounted in a stepped bore 156. The land b of valve element 152 is larger than land a so that when valve element 152 is moved from the downshift position shown in FIG. 2b to the upshift position connecting mainline 92 to feed port 157 and 1-2 shift signal line 158 for a shift from 1st to 2nd speed, there is an added hysteresis force in an upshift direction on valve element 152. In the downshift position shown, the 1-2 shift signal line 158 is connected to exhaust 159, and this hysteresis force is dropped. In both downshift and upshift positions, governor signal pressure line 161 is connected to chamber 162 at the end of bore 153 and acts on land a of valve element 152 in an upshift direction. Also, throttle pressure line 133 is connected to stepped bore 156 between the largest land c and the smaller land b of control element 154 to also provide an upshift direction force. Both the governor and throttle pressure upshift direction forces are opposed by the downshift direction bias force of spring 163, which is mounted on a suitable spring seat and stop assembly 164 in a spring chamber 166 vented by exhaust 167. When governor pressure and throttle forces overcome the spring bias force, both valve elements 152 and 154 upshift, and the throttle pressure from line 133 is also connected between lands a and b of control element 154. Since land 154b is larger than land 154a there is an additional area and upshift force after upshifting to control the downshift. This change in force is the torque demand hystersis force. The drive 1 line 103 supplies hold pressure and is connected via branch hold line 168 to hold shift valve element 152 in the downshift position when downshifted, or via branch hold line 169 when shift valve element 152 is upshifted to downshift shift valve element 152 at a predetermined speed. The regulated hold pressure supplied is insufficient to downshift above a predetermined speed.

The 2-3 shift signal valve 151' is similar to 1-2 shift signal valve 151, so reference numerals, primed, and reference to the above description for the similar portions are used, and the different portions described below.

The 2-3 shift valve element 152' has an additional larger land 152c', so the proportion of the areas of lands 152c' to 152a' is greater than the proportion of the areas of lands 152b to 152a, so the same hold pressure can be used for the 1-2 and 2-3 shift signal valves 151,151'. The stepped bore 153' has an additional step for land 152c' and an exhaust 170 at the additional step. The 2-3 shift signal valve 151' functions similarly in response to governor signal pressure in chamber 162' supplied by governor signal line 161, and throttle pressure from throttle pressure line 133 acting on control element 154' for upshifting and downshifting at higher speeds than the 1-2 shift signal valve 151. On an upshift, the 2-3 shift signal valve 151' connects mainline 92 to feed port 157' and 2-3 shift signal line 171.

The 3-4 shift signal valve 151" is like the 2-3 shift signal valve 151' described above, except for area and-/or spring change to provide shifting at higher speeds, so reference numerals, double-primed, have been used as reference to the above description is made. The 3-4 shift signal valve 151", on an upshift, connects mainline 92 to feed port 157" and 3-4 shift signal line 172.

RELAY VALVES

The 1-2 relay valve 176, (FIG. 2a), has a valve element 177, having equal diameter lands a, b, and c, located in a bore 178, and is biased to the 1st or lower speed position shown by spring 179 seated on spring seat 181 located in closed chamber 182. Valve element 177 has an integral valve stop and spring guide member 180. The chamber 182 is connected by a port 183 and a passage 184 through valve element 177 to a port 186 located in groove 187 in the land 177a to exhaust chamber 182 only in the upshift position to exhaust port 188. Mainline 92 supplies pressure to low feed port 191 and high feed port 192. The priority valve 193, constructed as shown in the above Schaefer et al U.S. Pat. No. 3,691,872, may be used in the portion of mainline 92 only feeding feed ports 191, 192, and has arranged in parallel a restriction and a full-flow relief valve closing to prevent full flow to 1-2 relay valve 176 when the pressure in mainline 92 is insufficient for properly operating the transmission, and open when the pressure is sufficient.

The 1-2 relay valve 176, in the 1st speed position shown, connects 1-2 shift line 196 via high supply port 197 between lands 177a and b, to exhaust port 188, blocks high feed port 192, connects mainline 92 via low feed port 191 between lands 177b and c via low supply port 199 to 1st apply line 201; land 177c blocks exhaust port 202, connects reverse selector or drive line 101 from the manual selector valve 96 to port 203 adjacent land 177c to spring chamber 182, which is closed since passage 184 is blocked at land 177a, and connects spring chamber 182 via port 204 to reverse feed line 206. When the 1-2 shift signal valve 151 provides pressure in 1-2 shift signal line 158 to supply fluid to closed actuator chamber 207, 1-2 relay valve element 177 is moved against the bias force of spring 179, except in reverse, to the 2nd speed position. Then reverse feed line 206 is connected to exhaust, via port 204 and spring chamber 182 which is connected via passage 184 to exhaust port 188; mainline 92 is connected via high feed port 192 to high supply port 197 and 1-2 shift line 196, low feed port 191 is blocked by land 177b; the 1st apply line 201 is connected via low supply port 199 to exhaust port 202, and reverse selector or drive line 101, at its port 203, is blocked by land 177c.

Thus during any forward drive operation, 1-2 relay valve 176, in the low or downshifted position shown, connects mainline 92 to 1st apply line 201 to engage 1st brake 81 and to exhaust 1-2 shift line 196, so the higher ratio devices are disengaged, and in high or upshifted position, exhausts 1st apply line 201 to disengage 1st brake 81 and connects mainline 92 to 1-2 shift line 196, so a higher ratio can be engaged. In reverse position, manual valve 96 supplies reverse selector or drive line 101 which, when the 1-2 relay valve 176 is in the 1st or low position, feeds reverse feed line 206 and pressurizes spring chamber 182 to hold 1-2 relay valve 176 in 1st or reverse position.

The 2-3 relay valve 176' is similar to the 1-2 relay valve 176, so like reference numerals, primed, have been used with reference to the above description. The minor differences and port connections are pointed out below.

The structure of the 2-3 relay valve 176' is like 1-2 relay valve 176, except the passage 184 in valve element 177 and its ports 183 and 186 are omitted, also port 203 is omitted, and the valve stop and spring guide 180' is a separate member. The 2-3 relay valve 176' has an actuator chamber 207' connected to 2-3 shift signal line 171, exhaust port 188', high supply port 197' connected to 3-4 shift feed line 208, high and low feed ports 191' and 192', both connected to 2-3 shift feed line 196', low supply port 199' connected to 2nd apply line 209, exhaust port 202' and exhaust port 204', always exhausting spring chamber 182'. The reverse drive and feed lines 101 and 206 are not connected to the 2-3 relay valve 176'. In forward drive ranges, when the 1-2 relay valve 176 upshifts to supply 1-2 shift line 196, the 2-3 relay valve 176', in low position, connects the 2-3 shift line 196' via port 191' to the 2nd apply line 209 to engage 2nd brake 73, and connects the 3-4 shift feed line 208 to exhaust port 188'. In the high position, the 2-3 relay valve 176' connects 2nd apply line 209 to exhaust port 202' and the 2-3 shift line 196' to 3-4 shift feed line 208.

The 3-4 relay valve 176" is like the 2-3 relay valve 176', and like reference numerals, double-primed, have been used and reference is made to the above description of the valve structure.

The 3-4 relay valve 176" has an actuator chamber 207" connected to the 3-4 shift signal line 172, a port 188" connected to reverse drive feed line 206, a high supply port 197" connected to 4th clutch apply line 211, low and high feed ports 191" and 192", both connected to 3-4 shift feed line 208 and a low supply port 199" connected to 3rd apply line 212. When in forward drive ranges with the 1-2 relay valve 176 and 2-3 relay valve 176' upshifted to supply 3-4 shift feed line 208, the 3-4 relay valve 176", in low position shown, connects 3-4 feed line 208 to 3rd apply line 212 to engage 3rd brake 63, and connects 4th apply line 211 to exhausted port 188" which is exhausted via reverse drive feed line 206, spring chamber 182, passage 184, and exhaust port 188 of 1-2 relay valve 176 to disengage 4th clutch 51. When 3-4 relay valve 176" is upshifted, 3rd apply line 212 is connected to exhaust port 202" to disengage 3rd brake 63, and 3-4 feed line 208 is connected to 4th apply line 211 to engage 4th clutch 51 for 4th speed drive.

GOVERNOR PRESSURE REGULATOR VALVE

The governor pressure regulator valve 216 regulates input governor pressure to provide a modified input governor pressure simulating output governor pressure so that it may be used primarily or secondarily to control the automatic shift control system. The governor pressure regulator valve 216 has a valve element 217 having large, equal diameter lands $a$ and $b$ in the largest diameter bore portion 218 of stepped bore 219, and sequentially smaller diameter lands $c$, $d$, and $e$, respectively, in sequentially smaller diameter bore portions 221, 222, and 223 of bore 219. The modified governor pressure line 226 is connected to largest bore portion 218 between lands 217a and b in all positions of valve element 217. Modified governor pressure restricted branch line 227 is connected to modified governor pressure chamber 228 in the closed end of largest bore portion 218, so modified governor pressure acts on the area of land 217a, providing a pressure decreasing bias force. The input governor pressure line 90 is connected to largest bore portion 218 at the regulating edge of land 217a and has an input governor pressure branch line 229 connected at the step and chamber 330 between largest bore portion 218 and the next smaller bore portion 221 to act on the differential area of land 217b, the area of land 217b minus the area of land 217c, to provide a pressure increasing bias force. Exhaust 231 is in the largest bore portion 218 at the regulating edge of land 217b. The ratio of the larger area of land 217a to the differential area of land 217b determines the basic pressure reduction ratio, about 4:1 in 4-speed transmissions, between the input governor pressure and reduced governor pressure. Thus, reduced governor pressure (FIG. 5, curves GR to 1st to 4th) is about 25% or specifically 21% in the curves of input governor pressure in the same ratio, respectively (curves G1 1st to 4th).

In 1st ratio, there is no shift signal pressure acting on the regulator valve element 217, so there is zero, a minimum value, 1st ratio pressure increasing bias force. In 2nd ratio, the 1-2 shift signal line 158 supplies 1-2 shift signal pressure to chamber 334 at the end of smallest bore portion 223 to act on the end area of smallest diameter land 217e to provide a low value 2nd ratio pressure increasing bias force. In 3rd ratio, the 2nd ratio bias force is continued and the 2-3 shift signal line 171 supplies 2-3 shift signal pressure at the step to chamber 333 between bore portions 222 and 223 to act on the differential area of land 217d to provide an added bias force, so the total 3rd ratio pressure increasing bias force is larger. In 4th ratio, the 2nd and 3rd ratio bias forces are continued, and the 3-4 shift signal line 172 supplies 3-4 shift signal pressure at the step to chamber 332 between bore portions 221 and 222 to act on the differential area of land 217c to provide an added bias force, so the total 4th ratio pressure increasing bias force is largest.

When the input governor pressure is less than, or equal to the modified governor pressure called for by the above pressure increasing bias forces, the governor pressure regulator valve 216 does not regulate but merely connects input governor pressure line 90 to modified governor pressure line 226 so modified governor pressure equals input governor pressure. When the input governor pressure is greater than the modified governor pressure called for by the above pressure increasing bias forces, the governor pressure regulator valve 216 regulates modified governor pressure in accordance with the above pressure increasing bias forces by opening modified governor pressure line 226 to input governor pressure line 90 for a pressure increase and to exhaust 231 for a pressure decrease.

The deactivator 236 has a piston 237 slidably sealed in bore 238. The piston 237 acts on a pin 239 slidably sealed in aperture 241 in wall 242 between bores 238 and 219. Spring 243 in spring chamber 244, a portion of bore 238, vented by exhaust 246, is seated on abutment 247 and biases piston 237 so that pin 239 engages modified governor pressure regulator valve element 217 to prevent regulation by connecting modified input governor pressure line 226 to exhaust 231, providing no (no zero) modified governor pressure. When the manual selector valve 96 is shifted to any forward drive position to supply drive 4 line 108, mainline 92 pressure is connected by drive 4 line 108 to deactivator release chamber 248 to move piston 237 to pin 239 away from governor pressure regulator valve element 217 to permit regulating operation of governor pressure regulator valve 216.

The output governor pressure line 94 and modified governor pressure line 226 are connected to shuttle valve 249 which connects the higher of these governor pressures to the governor signal pressure line 161 to operate the shift signal valves 151, 151', 151".

The operation of the governor pressure system having input and output governors 87, 93, governor pressure regulator valve 216, and shuttle valve 249, is described with reference to a specific example illustrated in the curves of FIGS. 3, 4, and 5. Since 4th ratio is a 1:1 drive, input shaft 12 speed and output shaft 53 speed are the same, and the 4th ratio input governor pressure in line 90, curve G1-4th, shown relative to output speed is the same relative to inut speed in all speed ratios. As the speed ratio is decreased from 4th to 1st, input shaft speed increases relative to output shaft speed, and input governor pressure is progressively lower speed ratios, though increasing at the same rate relative to input speed, increases at progressively higher rates relative to output shaft speed (curves G1-4th, to 1st, FIG. 5). Output governor pressure in line 94 increases with output shaft speed and functions during output governor operation (solid line curve G2, FIG. 5), and is nonfunctional during modified input governor operation (dash-dash line curves G2, FIGS. 3 and 4).

Since modified governor pressure regulator valve 216 is supplied by input governor pressure line 90, the modified input governor pressure in line 226 in each ratio (curves GM-1st to 4th), cannot exceed respectively input governor pressure in line 90 in the same ratio and at the same output speed (curves G1-1st to 4th, FIG. 5).

The governor pressure regulator valve 216, considering only the pressure reducing operation provided by the pressure reducing bias force of modified governor pressure acting on large area land 217a and the pressure increasing bias force of input governor pressure acting on the small differential area of land 217b, thus without any ratio signal pressure bias force, functions during regulating operation to provide reduced input governor pressure in each ratio (curves GR-1st to 4th), which is a reduced portion, e., 21%, of the respective ratio input governor pressure (curves G1-1st to 4th). The reduced input governor pressure in each ratio is combined with a base pressure provided by the ratio signal pressure bias forces to increase the base pressure with increasing speed ratio, 1st to 4th, to provide in each ratio modified input governor pressures (curves GM-1st to 4th), increasing at the same rate as reduced input governor pressure in the same ratio, from a base pressure level which increases with increasing speed ratio.

In the 1st ratio drive, the base pressure has a minimum value, preferably zero, since there is no ratio signal pressure and bias force on governor pressure regulator valve 216, so 1st ratio reduced input governor pressure and 1st ratio modified input governor pressure are the same (curve GR-1st, GM-1st), and have zero pressure at zero speed and pressure increase at a rate, relative to output speed, determined by the selection of the reduction portion, e.g., 21%, slightly less than the pressure increase rate of output governor pressure relative to output speed (curve G2).

In 2nd ratio drive, the base pressure has a low value, e.g., 18 psi, since the 1-2 shift signal pressure provides a low value pressure increasing 2nd ratio bias force on governor pressure regulator valve 216, so the regulated portion of 2nd ratio modified governor pressure (curve GM-2nd) is a constant low pressure value, e.g., 18 psi, higher than reduced input governor pressure (curve GR-2nd). The regulated portion of 2nd ratio modified governor pressure (curve GM-2nd), is extended in a phantom line to the zero speed ordinate to show the low base pressure value, e.g., 18 psi, but since this phantom portion has a higher pressure than the supply pressure, 2nd ratio input governor pressure (curve G1-2nd), it is not provided. Thus, the available 2nd ratio modified governor pressure (curve GM-2nd), is initially at low speeds, the same as 2nd ratio input governor pressure (curve G1-2nd), and increases with output speed up to the above regulated portion and then is the above regulated portion.

In 3rd ratio drive, the base pressure has an intermediate value, e.g., 36 psi, since the 1-2 and 2-3 shift signal pressures provide an intermediate value pressure increasing 3rd ratio bias force. Thus in a manner similar to 2nd ratio, the available 3rd ratio modified pressure (curve GM-3rd), is initially in a larger low speed range the same as 3rd ratio input governor pressure (curve G1-3rd), which increases at a lower rate relative to output speed than 2nd ratio input governor pressure, and increases with output speed up to and then is regulated at the constant base pressure value above 3rd ratio reduced governor pressure (curve GR-3rd).

In 4th ratio drive, the base pressure has a high value, e.g., 115 psi, since the 1-2, 2-3, and 3-4 shift signal pressures provide a high pressure increasing 4th ratio bias force. Thus, in a manner similar to 3rd ratio, the available 4th ratio modified governor pressure (curve GM-4th), is initially, and in most of the speed range the same as the 4th ratio input governor pressure (curve G1-4th), which increases at a lower rate than input governor pressure in 3rd ratio, and increases with output speed up to and then is at about maximum speed regulated at the constant base pressure value about 4th ratio reduced governor pressure (curve GR-4th).

During normal operation with the output governor providing normal output governor pressure (curve G2, FIG. 5) and output governor shift operation at the upshift points 1-2, 2-3, etc., and downshift points 2-1, 3-2, etc., the composite nominal output governor operation modified input governor pressure (curve NGM) follows the portion of the modified governor pressure in each drive ratio (curves GM-1st to GM-4th, FIG. 5), with a change from one ratio modified governor pressure to the next at each output governor operation shift point. Due to the pressure reduction ratio and base pressure levels, the nominal modified governor pressure (NGM) is always less than output governor pressure (curve G2), so output governor pressure in line 94 is fed by shuttle valve 249 to governor signal pressure line 161, and the lower nominal modified governor pressure in line 226 is blocked. FIG. 5 shows the nominal governor pressure (curve NGM) for upshift operation between successively higher ratio modified governor pressures (curves GM-1st to GM-4th), with upshift arrows at the 1-2, 2-3, and 3-4 upshift points, and similarly for downshift operation between successively lower ratio modified governor pressures (curves GM-4th to GM-1st), with downshift arrows at the 4-3, 3-2, and 2-1 downshift points. The modified governor pressure at a low speed downshift, as 2-1, while preferably less or the same as output governor pressure as shown, can be slightly higher than output governor pressure without significant delay of the downshift.

Figure 3:
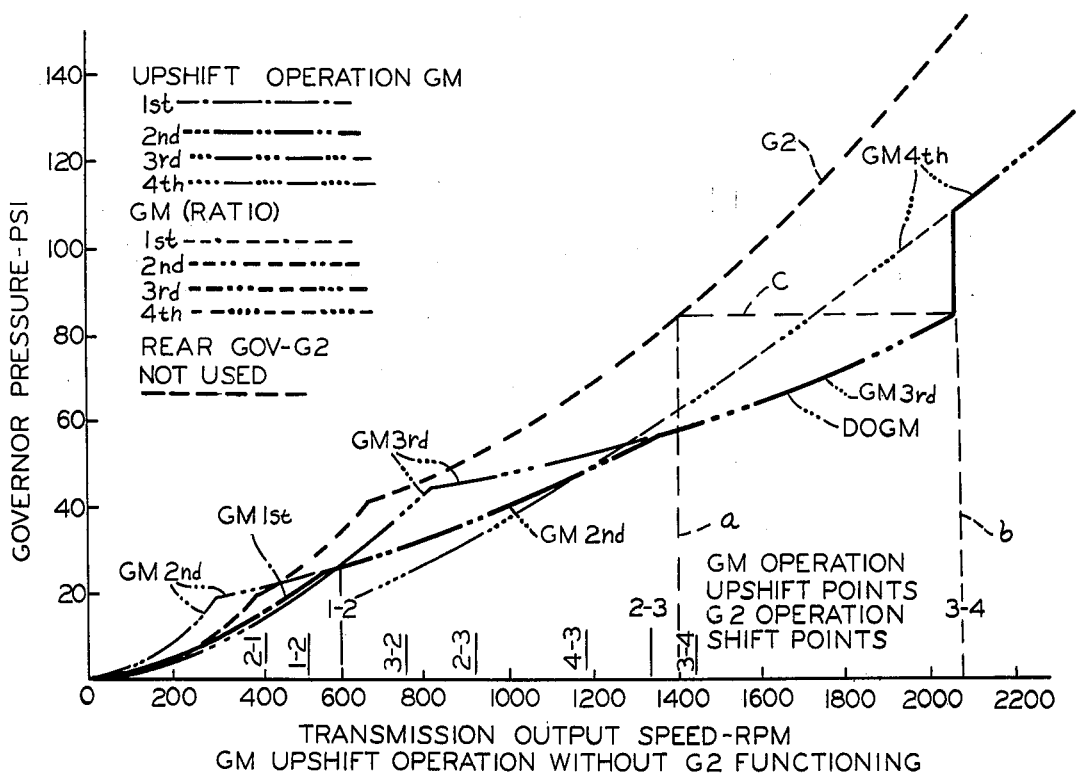
FIG. 3 is a plot of modified input governor pressure and output governor pressure relative to output speed to show modified input governor pressure automatic upshift operation.
Figure 4:
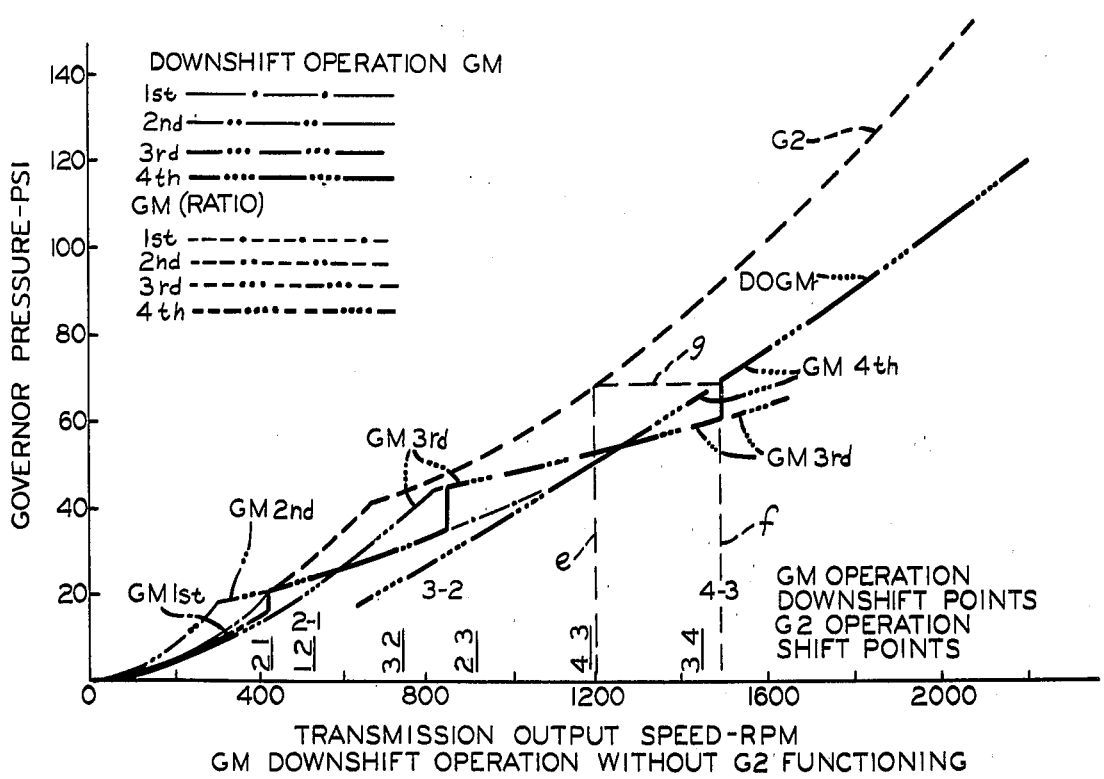
FIG. 4 is a plot of modified input governor pressure and output governor pressure relative to output speed to show modified input governor pressure automatic downshift operation.

When the modified governor pressures in each ratio (curves GM-1st to GM-4th) function to automatically shift the transmission, these pressures are combined to provide upshift operation modified governor pressure (curve UOGM) for upshift operation as shown in FIG. 3, and to provide downshift operation modified governor pressure (curve DOGM) for downshift operation, as shown in FIG. 4. The input modified governor pressure functions for automatic shifting in the absence of output governor pressure or when output governor pressure is less than modified input governor pressure, so normal output governor pressure, though not present, is shown as a phantom dashed line curve G2 in FIGS. 3 and 4 in order to show the relation of the shift points during modified input governor pressure shift operation and output governor pressure shift operation. The input governor pressures (curves G1) and the reduced governor pressures (curves GR) are the same in each ratio as shown in FIG. 5, and thus not shown in FIGS. 3 and 4. The modified governor pressures in each ratio (curves GM-1st to GM-4th) are the same in FIGS. 3, 4, and 5, but since the shift points occur at different output speeds during modified input governor shift operation (FIGS. 3 and 4), than during output governor shift operation (FIG. 5), the modified governor pressure for upshift operation (curve UOGM, FIG. 3) and for downshift operation (curve DOGM, FIG. 4) are different from each other and the nominal modified governor pressure (curve NGM, FIG. 5).

During modified governor pressure shift operation, as output speed increases in 1st ratio, when 1st ratio modified governor pressure (curve GM-1st) increases to the value of output governor pressure at the 1-2 shift point for output governor shift operation (FIG. 3), the modified input governor pressure upshifts the transmission to 2nd ratio, and the governor pressure regulator valve 216 provides 2nd ratio modified governor pressure (curve GM-2nd). similarly, as output speed continues to increase, modified governor pressure continues to increase in 2nd, 3rd, and 4th ratios (curves GM-2nd, -3rd, and -4th). In 2nd and 3rd ratios, as modified governor pressure increases to the value of output governor pressure providing respectively a 2-3 and 3-4 shift, the modified governor pressure provides a 2-3 and 3-4 shift. Since the shifts occur at the same pressure, these modified input governor pressure operation upshifts are at somewhat higher output speeds than output governor operation upshifts. The 3-4 upshift during output governor pressure operation occurs at speed line *a,* and the 3-4 upshift during modified governor pressure operation occurs at speed line *b.* These speed lines *a* and *b* respectively intersect their governor pressure curves, G2 and UOGM, at the equal governor pressure line *c.*

In the modified governor pressure downshift operation shown in FIG. 4, as output speed decreases from a high value in 4th ratio, modified governor pressure (curve GM-4th) decreases to the same pressure value as the value of output governor pressure that provides an output governor operation 4-3 downshift to provide a modified input governor operation 4-3 downshift. Thiis is demonstrated by the output governor operation 4-3 downshift speed line e and modified input governor 4-3 downshift speed line f intersecting their respective governor pressure curves (G2 and GM-4th or DOGM) at the equal governor pressure line g. The other modified governor downshifts similarly occur at the same governor pressure as output governor downshifts. At the 4-3 downshift, the downshift operation modified input governor pressure (curve DOGM), which had been 4th ratio modified governor pressure (curve GM-4th), changes to 3rd ratio modified governor pressure (curve GM-3rd). Then similarly as modified governor pressure decreases in 3rd and 2nd ratios (curves GM-3rd and GM-2nd), respectively, to the 3-2 and 2-1 shift point governor pressure values, the modified governor pressure provides the 3-2 and 2-1 downshifts and a change to the next lower ratio modified governor pressure (curves GM-2nd and GM-1st). These downshifts are at slightly higher speeds, except the 2-1 downshift which is shown at the same speed and may be at a slightly lower speed than the speed if made by output governor G-2, but this condition would also exist in normal automatic shifting.

MODIFICATION

Figure 1:
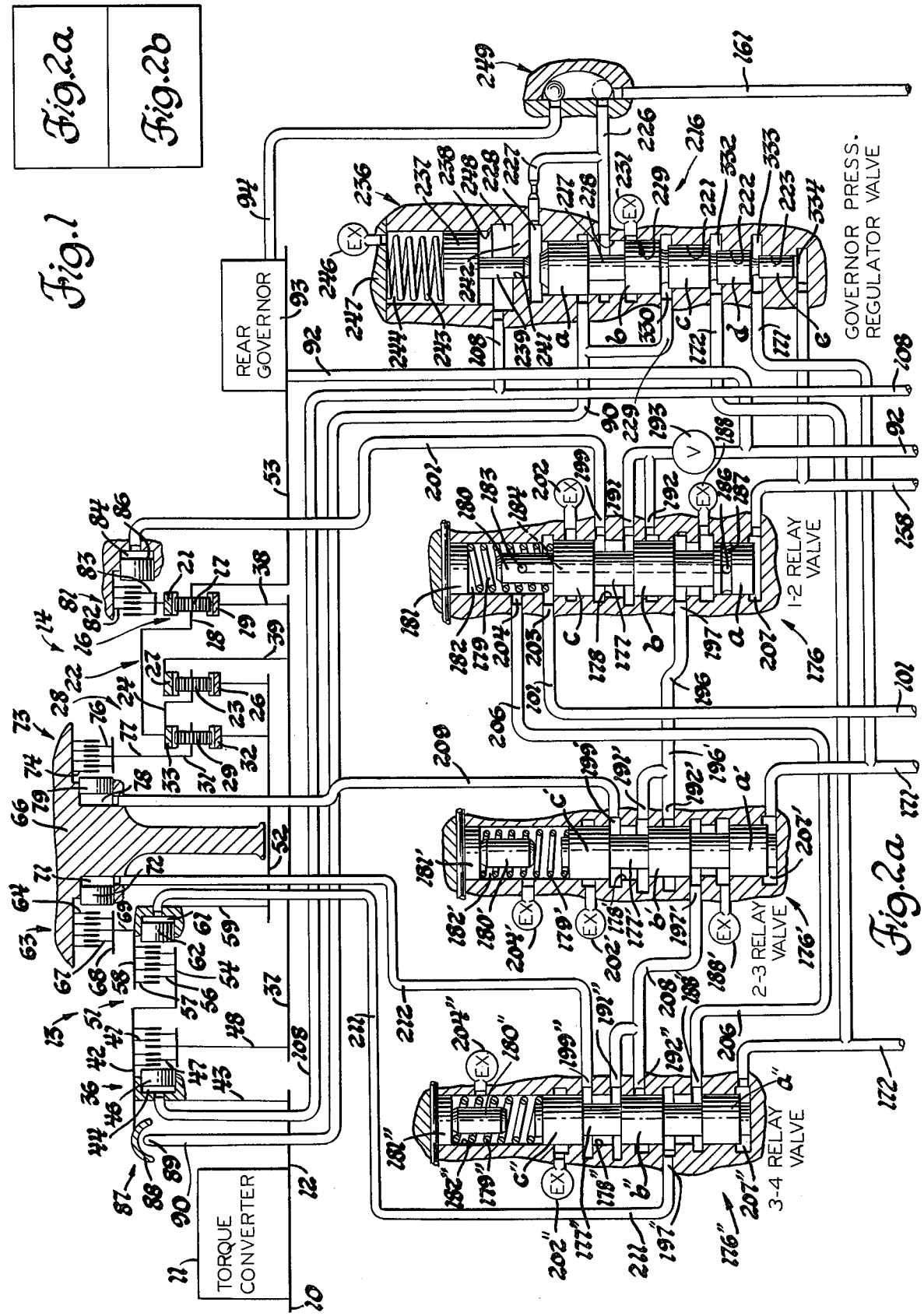
Figure 2:
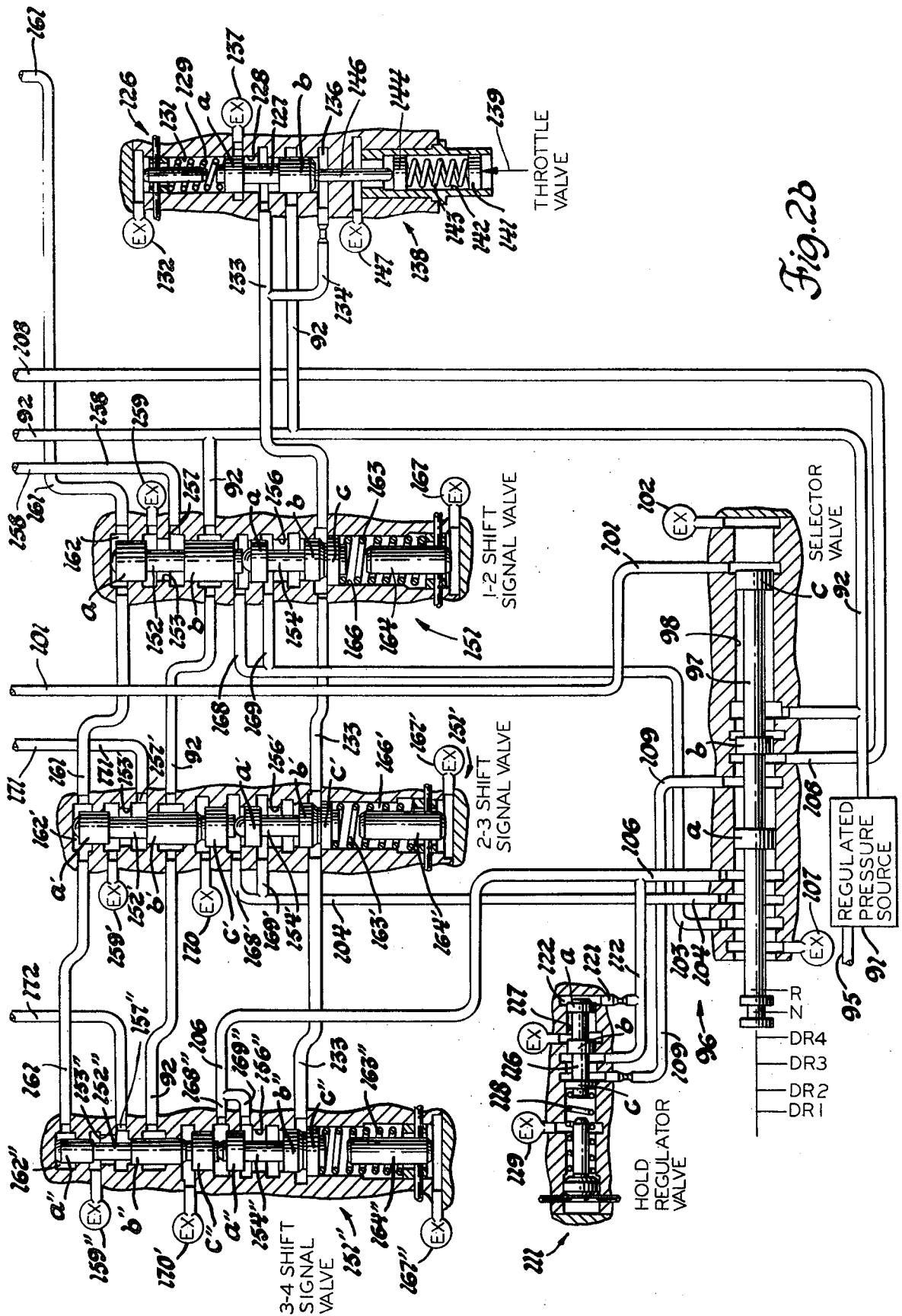

Transmission 251 (FIG. 6) has a power train 252 and modified controls 253 with throttle valve 254 and governor throttle pressure regulator valve 256. The governor throttle pressure regulator valve 256 is employed to provide a combined speed governor and torque demand signal to the conventional shift signal valves of the transmission controls 253. The transmission 251 is similar to the transmission shown in FIGS. 2a and 2b. The power train 252 is the same, having the torque converter 11 and powershift gearing 14 as shown in FIG. 2a and having input driven pitot-type input governor 87' providing input governor pressure in input governor line 90', like the input governor 87 and line 90 of FIG. 2a. Since this system does not use an output driven governor, the output governor 93 is omitted. The control system 253 is the same as shown in FIG. 2a, except inverted throttle pressure regulator valve 126 and throttle pressure line 133 are not used and connected to control the 1-2, 2-3, and 3-4 shift signal valves 151, 151', and 151". This may be simply accomplished by changing in these shift signal valves the throttle pressure ports to exhaust ports, or preferably by omitting the throttle pressure ports and changing control elements 154, 154', and 154" to single-land single-diameter control elements and control bores 156, 156', and 156". The bias force of springs 163, 163' and 163" is reduced to equal to FIG. 2 net downshift bias force at idle throttle, the spring bias force less the idle throttle bias force in downshift position. The shuttle valve 249 is omitted. Inverted throttle pressure regulator valve 126 is replaced by conventional throttle valve 254 actuated by throttle pedal 255 and providing throttle pressure in throttle pressure line 257 directly proportional to throttle position. Governor pressure regulator valve 216 is replaced by modified governor throttle pressure regulator valve 256 and connected, as described below, to pressure lines of the FIGS. 2a and 2b control system, identified by the same reference numerals, primed.

The modified governor throttle pressure regulator valve 256 (FIG. 6) has a regulator valve element 258, having equal diameter lands a and b movable in regulator bore 259. A throttle land 261 is an integral part of regulator valve element 258 and is mounted in coaxial throttle bore 262 and has one end integral with the end of land 258a, and the opposite free end in throttle chamber 263 connected to throttle pressure line 257, so throttle pressure acts on the free end of throttle land 261 to bias regulator valve element 258 in a regulated pressure decreasing direction. The speed governor throttle pressure signal line 161' is connected to the shift signal valves 151, 151', and 151" of controls 253 in the same manner as governor signal line 161 is connected in FIG. 2b, and also connected (FIG. 6) by branch 267 to regulator bore 259 between lands 258a and b in all valve positions, and by restricted branch 268 to regulating chamber 269 at the step between regulator bore 259 and throttle bore 262 to act on the differential area of land 258a (the area of land 258a less the area of land 261). Input governor line 90' is connected to regulating port 271 of regulator bore 259 at the regulating edge of land 258a. The regulator bore 259 has regulating exhaust port 272 at the regulating edge of land 258b. Exhaust 273 vents the bores 259, 276 between regulator valve element 258 and control valve element 274. The control element 274 has lands 274c, d, e, and f of sequentially decreasing diameter, slidably fitting in a stepped control bore 276 having a portion fitting each land and a step between each bore portion, and thus between each land.

There is a chamber at each step and at the end of control bore 276, respectively: 4th signal chamber 277 between lands 274c and d connected to 3-4 shift signal line 172'; 3rd signal chamber 278 between lands 274d and e connected to 2-3 shift signal line 171'; 2nd signal chamber 279 between lands 274e and f connected to 1-2 shift signal line 158'; and input governor chamber 281 at the end of land 274f connected to input governor pressure line 90'. The modified governor throttle pressure regulator valve 256 regulates modified governor throttle pressure in line 161' in response to the same input governor pressure in line 90' and the same 1-2, 2-3, and 3-4 shift signal pressures in lines 158', 171', and 172', acting on similar areas to provide the same pressure increasing bias forces and modified governor throttle pressure in line 161' as regulated by the above-described modified input governor pressure regulator valve 216. In addition, the modified governor throttle pressure regulator valve 256 decreases modified governor throttle pressure in line 161' in response to increasing throttle angle and pressure acting on throttle land 261.

A deactivator 236' (partially shown in FIG. 6), identical to deactivator 236 (FIG. 2a), may be used, having pin 239' engaging throttle land 261 to similarly exhaust governor throttle pressure signal line 161', so there is no upshift signal in neutral and reverse.

OPERATION

When the engine driving this transmission is running, the transmission regulated pressure source 91 (a conventional input driven pump and regulator valve) supplies fluid from a sump under pressure to mainline 92, which may be regulated at a normal line pressure value, e.g., 180 psi, when the transmission is in forward drive, and at a higher reverse drive pressure value, e.g., 300 psi, in reverse drive. Lubrication line 95, conventionally provided by the regulator valve overage and maintained above a low pressure, e.g., 80 psi, is used to supply the torque converter 11, the lubrication system for the transmission gearing, and input pitot tube governor 87.

In neutral position, the manual selector valve 96 connects reverse drive line 101 to exhaust 102, and drive 1 line 103, drive 2 line 104, and drive 3 line 106 to exhaust 107. The drive 4 line 108 is connected to hold feed line 109 and both are exhausted via hold regulator valve 11 and drive 3 line 106 to exhaust 107. Mainline 92 supplies the inverted throttle pressure regulator valve 126, output governor 93, and 1-2, 2-3, 3-4 shift signal valves 151, 151', 151", and 1-2 relay valve 176. The inverted throttle pressure regulator valve 126 provides inverted throttle pressure in line 133 inversely proportional to torque demand. The transmission output governor 93 provides an output governor signal in line 94 that is a function of output speed. The hold pressure regulator valve 111 is not supplied, and thus there is no hold pressure in line 112. The input pitot tube governor 87 provides a converter output or transmission gearing input governor pressure in line 90 which is a function of input speed, the speed of shaft 12.

Normally when the selector valve 96 is in neutral [N] position, the output or vehicle driven thereby will be stationary, or nearly so, and the engine is running to pressurize the system as pointed out above. The output governor pressure and modulator pressure will be insufficient to overcome the spring downshift bias force, so the 1-2, 2-3, and 3-4 shift signal valves 151, 151', and 151", will be in the downshift position, connecting the 1-2, 2-3, and 3-4 shift signal lines 158, 171, and 172, respectively, to exhausts 159, 159', and 159". The mainline 92 is directly connected to each shift signal valve 152, 152', 152", and blocked by the respective land 152b, 152b', 152b", thereof. Since there are no shift signal pressures, the 1-2, 2-3, and 3-4 relay valves 176, 176', and 176" are spring biased to the downshift or lower speed position. Mainline 92 is then directly connected by downshifted 1-2 relay valve 176 to 1st brake apply line 201 to engage 1st brake 81. Thus when the engine is running and selector valve 96 is in neutral [N] position, torque converter 11 is filled and operative, and at slow output speed, the 1st brake 81 is engaged and all other drive establishing devices disengaged for a positive neutral, and the automatic shift control system is ready for drive operation.

If the output is driven at higher speeds by the vehicle, with selector valve 96 inadvertently positioned in neutral and the engine running, the output governor and throttle pressure automatic control system will function as during automatic shifting drive, described below, to position the shift signal valves and relay valves in accordance with speed and torque demand to selectively engage 1st brake 81, 2nd brake 73, 3rd brake 63, or 4th clutch 51, but the transmission remains in positive neutral because forward clutch 36 is disengaged.

On movement of selector valve 96 to any forward drive position, forward clutch 36 will be engaged to engage the drive speed selected by the automatic controls. The drive and coasting automatic shift engagement sequence is the same, the drive always being completed by the 2nd, 3rd, or 4th speed engagement device.

On shifting manual selector valve 96 to the drive 4 position at output speeds and torque demand values insufficient to upshift 1-2 shift signal valve 151, mainline 92 is directly connected to drive 4 line 108 to directly supply fluid to engage forward clutch 36 to complete engagement of 1st speed drive since 1st brake 81 was engaged in neutral and remains engaged.

The other drive establishing devices are exhausted to disestablish the other drives. The 2nd brake apply line 209 is connected by downshifted 2-3 relay valve 176' to 1-2 shift feed line 196 which is connected by downshifted 1-2 relay valve 176 to exhaust port 188 for disestablishing 2nd brake 73. The 3rd brake apply line 212 is connected by downshifted 3-4 relay valve 176" to 2-3 shift feed line 208 which is connected by downshifted 2-3 relay valve 176' to exhaust port 188' to disengage 3rd brake 63. The 4th clutch apply line 211 is connected via downshifted 3-4 relay valve 176" to reverse feed line 206 which is connected by 1-2 relay valve 176 and reverse drive line 101 to exhaust 102 at manual selector valve 96 to disengage 4th clutch 51.

When the speed of the vehicle increases, governor signal pressure in line 161, which may be either output governor pressure or modified input governor pressure as described, upshifts 1-2 shift signal valve 151 against the spring bias force of spring 163, reduced by the throttle bias force provided by throttle pressure from line 133 acting on control element 154. The upshifted 1-2 shift signal valve 151 closes exhaust 159 and supplies mainline 92 pressure to 1-2 shift signal line 158 which acts in chamber 207 to upshift 1-2 relay valve 176 from the downshifted position against the spring bias force of spring 179 to the upshifted position. Upshifted 1-2 relay valve 176 connects 1st apply line 201, which had engaged 1st brake 81, to exhaust port 202 to disengage 1st brake 81 and connects mainline 92 from high feed port 192 beteen 1-2 relay valve element lands 177a and b to 1-2 shift feed line 196 which is connected by port 191' between lands 177b' and 177c' of downshifted relay valve 176' to 2nd brake apply line 209 for engagement of 2nd brake 73 for 2nd speed drive.

At a higher speed, governor signal pressure similarly upshifts 2-3 shift signal valve 151', so 2-3 shift signal line 171 is disconnected from exhaust 159' and connected to mainline 92. The 2-3 shift signal line 171 is connected to chamber 207' of 2-3 relay valve 176' to upshift this valve 176' to the upshifted position connecting 2nd brake apply line 209 to exhaust port 202' and connecting the 2-3 shift feed line 196, via high feed port 192' and between lands 176a' and 177b' to 3-4 shift feed line 208, which is connected by low feed port 191" between lands 177b" and 177c" of downshifted 3-4 relay valve 176" to 3rd brake apply line 212, to engage 3rd brake 63 for 3rd speed drive.

At a still higher speed, the governor signal pressure will upshift the 3-4 shift signal valve 151" so 3-4 shift signal line 172 is disconnected from exhaust 159" and connected to mainline 92 to supply pressure to chamber 207" to upshift 3-4 relay valve 176". Upshifted 3-4 relay valve 176" will then connect 3rd brake apply line 212 to exhaust 202" and connect 2-3 shift feed line 208, via high feed port 192", to 4th clutch apply line 211 and 4th clutch 51 to engage 4th speed drive.

A reduction of governor signal pressure due to decreasing output speed and/or throttle pressure due to increasing torque demand will effect a downshift of the shift signal valves sequentially—the 3-4 shift signal valve 151", the 2-3 shift signal valve 151', and then the 1-2 shift signal valve 151, to provide the reverse of the above-described upshifting operation, and thus provide downshifting in this sequence.

Movement of manual selector valve 96 to drive 3 position [DR3], in addition to supplying previously supplied drive 4 line 108, also feeds the hold feed line 109 and blocks the exhaust of drive 3 feed line 106. Thus, the hold pressure is regulated by hold regulator valve 111, when supplied with mainline 92 pressure by hold feed line 109, and supplies hold pressure via hold pressure line 112 to drive 3 feed line 106, which is connected by port 168" or 169" between 3-4 shift signal valve element 152" and control element 154" to downshift 3–4 shift signal valve 151" or hold it downshifted at a higher speed than during normal governor throttle operation. Thus, normal power driving would be limited to 1st to 3rd speed drives, but higher speed coast upshifts to 4th speed drive are permitted.

Movement of manual selector valve 96 to the drive 2 position [DR2] will additionally interconnect the drive 3 line 106 to also supply hold pressure to drive 2 line 104 which is similarly connected, and acts on 2–3 shift signal valve 151' for shifting from 2nd to 3rd speed position at a higher speed, so during normal power drive only shifts between 1st and 2nd speed drives are provided, but with higher speed coast upshifts to 3rd and 4th.

Movement of manual selector valve 96 to the drive 1 position [DR1] additionally connects hold pressure from drive 3 feed line 106 to drive 1 line 103, which is similarly connected and acts on 1–2 shift signal valve 151 to control 1–2 relay valve 176 to normally hold 1st speed, but to permit higher speed coast upshifts.

In order to make a shift to reverse, the manual selector valve 96 must be first moved to neutral position [N], placing the control system in the above-described neutral condition, and then to reverse position [R]. In the reverse position, manual selector valve 96 exhausts drive 4 line 108 through exhausted hold feed line 109, hold regulator valve 111, and exhausted drive 3 line 106 to exhaust 107. Exhausting the drive 4 line 108, as in neutral, prevents establishing of forward drive clutch 36, so forward drive ratios cannot be established, and deactivator 236 acts to deactivate governor pressure regulator 216 to connect modified governor pressure line 226 to exhaust 231, so there is no modified governor pressure.

To establish reverse drive, the output speed must be low so the respective 1–2, 2–3, and 3–4 shift signal valves (151, 151', 151") downshift to place the 1–2, 2–3, and 3–4 relay valves (176, 176', 176") in the downshift position. Selector valve 96, in reverse position [R], connects mainline 92 to reverse drive line 101 which, with 1–2 relay valve 176 and 3–4 relay valve 176" in the downshift position, operates to engage 1st brake 81 and 4th clutch 51 to establish reverse drive. If the transmission output is running at speeds sufficient to call for establishment of 2nd or higher speeds by the automatic control system, exhausting drive 4 line 108 places the transmission in neutral. When the speed reduces to a low value, sufficient for a downshift of 1–2 shift signal valve 151 and 1–2 relay valve 176, the 1–2 relay valve 176 connects mainline 92, through low feed port 191 to 1st brake apply line 201 to engage 1st brake 81 and connects reverse drive line 101, as passage 184 is blocked, to reverse feed line 206 which is connected by downshifted 3–4 relay valve 176" to 4th apply line 211 to engage 4th clutch 51 for reverse drive.

During normal automatic shift operation, output governor 93 provides output governor pressure increasing with output speed (curve G2, FIG. 5) to output governor pressure line 94 which is connected by shuttle valve 249 to governor signal pressure line 161 and 1–2, 2–3, and 3–4 shift signal valves (151, 151', 151"), for output governor automatic shifting at the output governor pressure valve and the output governor operation automatic shift points (upshift points 1–2, 2–3, 3–4, and downshift points 4–3, 3–2, 2–1), shown in FIG. 5. As described above, the modified input governor pressure, supplied by governor pressure regulator valve 216 to modified governor pressure line 226, has a modified governor pressure value increasing with output speed in each ratio (ratio curves GM-1st to GM-4th), each providing portions of the nominal composite modified input governor pressure (curve NGM) for both upshift and downshift operation. Since the nominal modified input governor pressure is, at all output speeds substantially equal to, or slightly less than normal output governor pressure (curve G2), the shuttle valve 249 blocks modified governor pressure line 226.

If output governor pressure in line 94 is less than nominal modified input governor pressure in line 226, the latter will be supplied by shuttle valve 249 to governor signal pressure line 161 and to the 1–2, 2–3, and 3–4 shift signal valves (151, 151', 151") for modified input governor pressure automatic shifting operation, as explained above with reference to FIG. 3 for upshifting, and FIG. 4 for downshifting. The shift signal valves shift in response to the same governor signal pressure value for each shift whether supplied by the modified input governor pressure or output governor pressure. Since the modified input governor pressure for upshift operation (curve UOGM, FIG. 3) and for downshift operation (curve DOGM, FIG. 4) is substantially the same at low speeds, and generally lower than the output governor pressure at corresponding higher output speeds, the shift points during modified input governor pressure operation occur at about the same and slightly higher speeds as compared to output governor operation shift points, as indicated in FIGS. 3 and 4.

The modified input governor pressures in each ratio, the 1st to 4th ratio input governor pressures, are combined in response to transmission shifting to provide a composite modified input governor pressure curve (upshift operation curve UOGM, FIG. 3, or downshift operation curve DOGM, FIG. 4), which will increase with portions at slightly different slopes in a mean range of slopes to simulate output governor pressure increase with output speed. During output governor shift operation, the upshift and downshift output governor operation composite nominal modified input governor pressure (curve NGM) changes between the ratio modified input governor pressures (curves GM-1st to 4th), at the output governor operation upshift points and lower downshift points and varies with output speed to simulate output governor pressure variation with output speed at values essentially always less than output governor pressure values at a corresponding output speed. During modified input governor shift operation, the similar upshift and downshift input governor operation composite modified input governor pressure (curves UOGM and DOGM), change at upshift and downshift modified input governor operation shift points, and varies with output speed to simulate, and be a little less than, the output governor pressure (curve G2).

In the modified transmission 251 (FIG. 6), the output governor 93 is not used and the input governor 87' provides an input governor pressure in each ratio similar to the pressure curves G1-1st to G1-4th of FIG. 5. The modified governor throttle regulator valve 256, like modified governor regulator valve 216, proportionally reduces the regulated throttle pressure to a reduced pressure in each ratio, like the GR-1st to GR-4th pressure curves of FIG. 5, and then increases the reduced pressure in 2nd to 4th ratios by the shift signal pressures to ratio modified governor pressure like modified governor pressure curves GM-1st to GM-4th of FIGS. 3, 4, and 5.

Since at idle throttle, conventional throttle valve 254 provides zero throttle pressure, governor throttle regulator valve 256 provides the same value governor throttle regulated pressure in governor signal pressure line 161' as the modified governor regulator valve 216 provides at corresponding speeds, as shown in curves GM-1st to GM-4th, FIGS. 3 and 4, at idle throttle. With the bias force of springs 163, 163' and 163" reduced to equal the FIG. 2 net downshift bias force at idle throttle, the spring bias force less the opposing idle throttle bias force in downshift position, upshifts will occur at about the same output speed as during front governor operation in FIG. 2, curves FIG. 3, and downshifts will occur at a low speed, with the same speed difference between corresponding upshifts and downshifts due to mainline hysteresis on the shift valves. If the shift signal valves have the same areas and spring bias force as in FIG. 2, the modified governor throttle pressure of the FIG. 6 transmission at idle throttle would be greater than the governor pressure in FIG. 3 so that wide open throttle modified governor throttle pressure would be about the same as governor pressure in FIG. 3 to provide the shift points at similar output speeds. As the throttle pedal 255 is advanced and throttle valve 254 provides a proportionally higher throttle pressure in line 257 and chamber 263, there is developed a pressure reducing force on land 261 of throttle regulator valve element 258 to regulate modified governor throttle pressure in line 161' proportionally lower than modified governor pressure (curves GM-1st to GM-4th), at corresponding speeds in response to throttle pedal advance. The modified governor throttle pressure in line 161' provides a single pressure for operating the shift signal valves for automatic shifting in response to output speed and torque demand with a constant hysteresis or difference between upshift and downshift speeds.

It will be appreciated that the invention may be used in the above-described preferred embodiments and modifications thereof.

I claim:

1. In a transmission: an input; an output; a gear unit connecting said input and output having gear unit control means including a plurality of ratio establishing means selectively actuated to provide a low ratio drive and a high ratio drive; a source of regulated pressure fluid; an input governor connected to said input providing an input governor pressure proportional to input speed and increasing in said low ratio drive in a higher proportion to output speed than in said high ratio drive; shift valve means operatively connected to said source and said gear unit control means and having an actuator and operative to establish said low ratio drive, and in response to a higher governor pressure in said actuator to automatically shift to establish said high ratio drive; speed pressure control means operatively connected to said input governor and said shift valve means operative when said shift valve means provides a drive and in response to input governor pressure to regulate modified input governor pressure at values in said low ratio drive proportionately reduced relative to input governor pressure to reduced values increasing in a reduced proportion to output speed to said higher governor pressure and in said high ratio drive to provide said input governor pressure in said high ratio drive up to a limit value and then modified input governor pressure regulated at values proportionately reduced in said reduced proportion and increased in a constant proportion to provide modified input governor pressure similarly varying with output speed in said low and high ratio drives.

2. The invention defined in claim 1, and said speed pressure control means including torque demand means operative to reduce said modifed input governor pressure proportional to increasing torque demand.

3. In a transmission: an input; an output; a gear unit connecting said input and output having gear unit control means including a plurality of ratio establishing means selectively actuated to provide a low ratio drive and a high ratio drive; a source of regulated pressure fluid; an input governor connected to said input providing an input governor pressure proportional to input speed and increasing in said low ratio drive in a higher proportion to output speed than in said high ratio drive; shift valve means operatively connected to said source and said gear unit control means having an actuator and operative to establish said low ratio drive and in response to a higher governor pressure value in said actuator to automatically shift to establish said high ratio drive; speed pressure control means operatively connected to said input governor and said shift valve means operative when said shift valve means provides a drive and in response to the supply of said input governor pressure to regulate a low ratio drive modified input governor pressure at values in said low ratio drive proportionally reduced relative to said input governor pressure to reduced increasing values in a reduction proportion to output speed at least to said higher governor pressure value and in said high ratio drive to provide high ratio drive modified input governor pressure at values equal to said input governor pressure in said high ratio drive up to a limit value and then regulated modified input governor pressure regulated at values proportionally reduced in said reduction proportion and constantly increased to provide regulated modified input governor pressure increasing from said limit value at a lower rate relative to input and output speed and operative to provide a composite modified input governor pressure changing between said low and said high ratio drive modified input governor pressure in response to a shift between said low and high ratio drives and varying in a mean range of slopes with output pressure at the same output speeds.

4. In a transmission: an input; an output; a gear unit connecting said input and output having gear unit control means including a plurality of ratio establishing means selectively actuated to provide a low ratio drive and a high ratio drive; a source of regulated pressure fluid; an output governor connected to said output providing an output governor pressure proportional to output speed; an input governor connected to said input providing an input governor pressure proportional to input speed and increasing in said low ratio drive in a higher proportion to output speed than output governor pressure; shift valve means operatively connected to said source and said gear unit control means having an actuator and operative to establish said low ratio drive and in response to a higher governor pressure in said actuator to automatically shift to establish said high ratio drive; speed pressure control means operatively connected to said input governor and said shift valve means operative when said shift valve means provides a drive and in response to the supply of input governor pressure to regulate a low ratio drive modified input governor pressure at values in said low ratio drive proportionally reduced relative to input governor pressure to reduced values increasing in proportion to output speed, and in said high ratio drive to provide a high ratio drive input governor pressure in said high ratio drive to provide a composite modified input governor pressure changing between said low ratio drive input governor pressure and said high ratio drive input governor pressure in response to a shift between said low and high ratio drives and varying with output speed simulating output governor pressure and not significantly more than output governor pressure at the same output speeds; and means operatively connected to said output governor, said actuator, and said speed pressure control means operative to normally connect said output governor pressure to said actuator operative in response to an abnormal reduction of output governor pressure to a value less than said composite input governor pressure at any output speed to connect said composite input governor pressure to said actuator.

5. In a transmission: an input; an output; a gear unit connecting said input and output having gear unit control means including a plurality of ratio establishing means selectively actuated to provide a low ratio drive and a high ratio drive; a source of regulated pressure fluid; an output governor connected to said output providing an output governor pressure proportional to output speed; an input governor connected to said input providing an input governor pressure proportional to input speed and increasing in said low ratio drive in a higher proportion to output speed than output governor pressure; shift valve means operatively connected to said source and said gear unit control means having an actuator and operative to establish said low ratio drive in response to a higher governor pressure value in said actuator to automatically shift to establish said high ratio drive; speed pressure control means operatively connected to said input governor and said shift valve means operative when said shift valve means provides a drive and in response to the supply of input governor pressure to regulate modified input governor pressure at values in said low ratio drive proportionally reduced relative to input governor pressure to reduced values less in a reduction proportion to output speed than output governor pressure values in proportion to output speed and increasing at least to said higher governor pressure value, and in said high ratio drive to provide said input governor pressure in said high ratio drive up to a limit value and then modified input governor pressure regulated at values proportionally reduced in said reduction proportion and increased in a constant proportion to provide said modified input governor pressure varying with output speed similar to output governor pressure and not more than output governor pressure at the same output speeds; and means operatively connected to said output governor, said actuator, and said speed pressure control means operative to normally connect said output governor pressure to said actuator and operative in response to an abnormal reduction of output governor pressure to a value less than said modified input governor pressure at any output speed to connect said modified input governor pressure to said actuator.

6. In a transmission: an input member; an output member; a gear unit connecting said input member and said output member and having gear unit control means including a plurality of ratio establishing means selectively actuated to provide a low forward ratio drive; a high forward ratio drive, and reverse drive; a source of regulated pressure fluid; an output governor connected to said output member providing an output governor pressure proportional to output member speed; an input governor connected to said input member providing an input governor pressure proportional to input member speed and increasing in said low forward ratio drive in a higher proportion to output member speed than output governor pressure; shift valve means operatively connected to said source and said gear unit control means having an actuator and manually operable to connect a first forward apply pressure to said gear unit control means to establish said low forward ratio drive, and in response to a higher governor pressure value in said actuator to automatically shift to connect a high forward apply pressure to said gear unit control means to establish said high forward ratio drive, and manually operable to connect a reverse drive pressure to said gear unit control means to establish said reverse drive; speed pressure control means operatively connected to said input governor and said shift valve means, operative when said shift valve means provides a forward drive and in response to the supply of said input governor pressure to regulate modified input governor pressure at values in said low forward ratio drive proportionally reduced relative to said input governor pressure to reduced values less in a reduction proportion to output member speed than output governor pressure values in proportion to output member speed, and increasing at least to said higher governor pressure value, and in said high forward ratio drive to provide said input governor pressure in said high forward ratio drive up to a limit value and then modified input governor pressure regulated at values proportionally reduced in said reduction proportion and constantly increased in proportion to the ratio change from said low to high forward ratio drive and the relation of said input and output governor pressures to provide said modified input governor pressure varying with output member speed similar to said output governor pressure and normally not more than output governor pressure at the same output member speed; disabling means operatively connected to said shift valve means and said speed pressure control means operative when said shift valve means establishes said reverse drive to disable said speed pressure control means to prevent providing said modified input governor pressure; and means operatively connected to said output governor, said actuator, and said speed pressure control means operative to normally connect said output governor pressure to said actuator for output governor automatic shifting and operative in response to an abnormal reduction of output governor pressure to a value less than said modified input governor pressure at any output member speed to connect said modified input governor pressure to said actuator for input governor automatic shifting providing a change between said low and high forward ratio drive modified input governor pressures increasing in a mean slope range simulating output governor pressure increase relative to output member speed.

* * * * *

UNITED STATES PATENT AND TRADEMARK OFFICE
CERTIFICATE OF CORRECTION

PATENT NO. : 4,082,009
DATED : April 4, 1978
INVENTOR(S) : Carl A. Lentz

It is certified that error appears in the above-identified patent and that said Letters Patent are hereby corrected as shown below:

Column 9, line 23, "to" first occurrence, should be deleted.

Column 10, line 1, "(no zero)" should read -- (or zero) --

Column 11, line 45, "about" should read -- above --

Column 15, line 2, "11" should read -- 111 --

Column 17, line 64, "valve" should read -- value --

Signed and Sealed this

Nineteenth Day of December 1978

[SEAL]

Attest:

RUTH C. MASON
Attesting Officer

DONALD W. BANNER
Commissioner of Patents and Trademarks